(12) United States Patent
Lee et al.

(10) Patent No.: US 9,680,135 B2
(45) Date of Patent: Jun. 13, 2017

(54) POUCH-TYPE FLEXIBLE FILM BATTERY

(75) Inventors: Young-Gi Lee, Daejeon (KR); Kwang Man Kim, Daejeon (KR); Min Gyu Choi, Daejeon (KR); Kunyoung Kang, Gyeongsangnamdo (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 1276 days.

(21) Appl. No.: 13/224,318

(22) Filed: Sep. 1, 2011

(65) Prior Publication Data

US 2012/0058378 A1 Mar. 8, 2012

(30) Foreign Application Priority Data

Sep. 2, 2010 (KR) .......................... 10-2010-0086136
Dec. 22, 2010 (KR) .......................... 10-2010-0132272

(51) Int. Cl.

| H01M 10/056 | (2010.01) |
| H01M 2/02 | (2006.01) |
| B32B 27/08 | (2006.01) |
| H01M 10/052 | (2010.01) |
| H01M 10/0565 | (2010.01) |
| H01M 10/0585 | (2010.01) |
| B32B 15/08 | (2006.01) |
| B32B 15/085 | (2006.01) |
| B32B 27/30 | (2006.01) |

(Continued)

(52) U.S. Cl.

CPC .......... H01M 2/0207 (2013.01); B32B 15/08 (2013.01); B32B 15/085 (2013.01); B32B 27/08 (2013.01); B32B 27/306 (2013.01); B32B 27/32 (2013.01); H01M 2/0275 (2013.01); H01M 2/0277 (2013.01); H01M 2/0285 (2013.01); H01M 10/052 (2013.01); H01M 10/0565 (2013.01); H01M 10/0585 (2013.01); B32B 37/20 (2013.01); B32B 38/0004 (2013.01); B32B 2307/50 (2013.01); B32B 2307/7242 (2013.01); B32B 2309/02 (2013.01); B32B 2309/105 (2013.01); B32B 2457/00 (2013.01);

(Continued)

(58) Field of Classification Search

CPC .................. H01M 10/0565; H01M 2300/0085
USPC ....................................................... 429/301
See application file for complete search history.

(56) References Cited

U.S. PATENT DOCUMENTS

| 5,721,072 A | 2/1998 | Mototani et al. |
| 5,811,204 A | 9/1998 | Nitzan |

(Continued)

FOREIGN PATENT DOCUMENTS

| CN | 1088647 C | 8/2002 |
| CN | 1210830 C | 7/2005 |

(Continued)

OTHER PUBLICATIONS

N. Vassal, et al., "Electrochemical properties of an alkaline solid polymer electrolyte based on P(ECH-co-EO)", Electrochimica Acta 45, No. 8-9, pp. 1527-1532, Jan. 2000.

(Continued)

*Primary Examiner* — Ula C Ruddock
*Assistant Examiner* — Frank Chernow
(74) *Attorney, Agent, or Firm* — Rabin & Berdo, P.C.

(57) ABSTRACT

A pouch-type flexible film battery, including: (a) a cathode structure including a cathode pouch, a cathode conductive carbon layer, and a cathode layer; (b) an anode structure including an anode pouch, an anode conductive carbon layer, and an anode layer; and (c) a polymer electrolyte layer that is provided between the cathode and anode structures, that is bonded to the cathode layer and to the anode layer, and that is a gel-type electrolyte having adhesive properties and including a cellulose-based polymer.

9 Claims, 11 Drawing Sheets

(51) Int. Cl.
*B32B 27/32* (2006.01)
*B32B 37/20* (2006.01)
*B32B 38/00* (2006.01)

(52) U.S. Cl.
CPC ....... *B32B 2457/10* (2013.01); *H01M 2/0287* (2013.01); *H01M 2/0292* (2013.01); *H01M 2300/0085* (2013.01); *Y02P 70/54* (2015.11); *Y10T 156/10* (2015.01)

(56) References Cited

U.S. PATENT DOCUMENTS

2002/0076617 A1* 6/2002 Kezuka et al. ............... 429/306
2009/0026662 A1* 1/2009 Yun et al. ..................... 264/466
2011/0311856 A1* 12/2011 Matsui et al. ................. 429/145

FOREIGN PATENT DOCUMENTS

| KR | 10-0143904 | 3/1991 |
| KR | 10-0245575 B1 | 11/1999 |
| KR | 20-0193473 Y1 | 6/2000 |
| KR | 10-2003-0017945 A | 3/2003 |
| KR | 10-0714128 B1 | 4/2007 |
| KR | 10-0753824 | 8/2007 |
| KR | 10-0760748 B1 | 9/2007 |
| KR | 10-2010-0071798 A | 6/2010 |

OTHER PUBLICATIONS

Uwe Köhler et al., "Advances in alkaline batteries", Journal of Power Sources 127, No. 1-2, pp. 45-52, Mar. 10, 2004.

\* cited by examiner

POUCH-TYPE FLEXIBLE FILM BATTERY

CROSS-REFERENCE TO RELATED APPLICATIONS

This U.S. non-provisional patent application claims priority under 35 U.S.C. §119 of Korean Patent Applications Nos. 10-2010-0086136, filed on Sep. 2, 2010, and 10-2010-0132272, filed on Dec. 22, 2010, the entire contents of which are hereby incorporated by reference.

BACKGROUND

The present invention disclosed herein relates to a film battery and more particularly, to a pouch-type flexible film battery and a method of manufacturing the same.

Recently, interests in flexible devices, such as a rollable display, e-paper, a flexible liquid crystal display (LCD), a flexible organic light-emitting display (OLED), and a wearable PC, has been rapidly increased. As a result, a power supply for the flexible devices has also been required to have flexible characteristics.

In consideration of operating environments, a flexible power supply has to be manufactured to have durability in addition to the flexible characteristics. For example, under a repeated bending motion, the flexible power supply has to be manufactured to satisfy that 1) cracks are not generated in respective components thereof, and 2) separation phenomena do not occur between the components thereof. In addition, in order to successfully introduce the flexible power supply in the market, reduction in the manufacturing cost of the flexible power supply is necessary. To reduce the manufacturing cost, it is favorable that the film battery is manufactured through a simple and continuous manufacturing process.

The flexible characteristics may be satisfied through manufacturing the components of the flexible power supply by using materials having ductile characteristics. However, it was difficult to simultaneously satisfy the durability and the flexible characteristics according to the technologies which have been suggested until now. For example, a polymer film having flexible characteristics (e.g., polyethylene terephthalate) was suggested as a packing material of the film battery. However, since most of the polymer films are not capable of completely blocking the penetration of moisture or gas as well as having insufficient corrosion resistance to strong acid or strong base, technical limitations such as the leakage or drying of an electrolyte may be generated.

Though some polymer films (e.g., polypropylene) have sufficiently large corrosion resistance to strong acid or strong base, these polymer films have other physical properties causing complexity in the manufacturing process of the film battery. For example, although screen printing is a method of forming a thin film that can reduce the manufacturing cost, formation of a layer directly on polypropylene is difficult through screen printing because polypropylene has low surface energy and hydrophobicity. In addition, according to the related art, contact property between electrodes and an electrolyte constituting the film battery deteriorated over prolonged operation. For example, separation between the electrodes and the electrolyte occurred or physical contact deteriorated.

SUMMARY

The present invention provides a pouch-type flexible film battery capable of satisfying durability and flexible characteristics at the same time.

The present invention also provides a pouch-type flexible film battery having excellent bonding characteristics between electrodes and an electrolyte.

The present invention also provides a pouch-type flexible film battery capable of improving productivity in a manufacturing process.

The present invention also provides a method of manufacturing the pouch-type flexible film battery capable of improving productivity in a manufacturing process.

Embodiments of the present invention provide a pouch-type flexible film battery including a polymer electrolyte layer containing a cellulose-based polymer. In particular, the film battery includes: a cathode structure including a cathode pouch, a cathode conductive carbon layer, and a cathode layer; an anode structure including an anode pouch, an anode conductive carbon layer, and an anode layer; and a polymer electrolyte layer between the cathode and anode structures, wherein the polymer electrolyte layer may be a gel-type electrolyte including a cellulose-based polymer.

In some embodiments, the polymer electrolyte layer may include a polymer matrix including the cellulose-based polymer and a strength reinforced polymer. At this time, a weight ratio between the cellulose-based polymer and the strength reinforced polymer may be in a range of about 1:99 to about 99:1.

In other embodiments, the cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

In still other embodiments, the strength reinforced polymer may include at least one of a polyvinylidene fluoride-based polymer, a polyvinylchloride derivative, an acrylonitrile-based polymer derivative, polyvinyl acetate, polyvinyl alcohol, polyimide, polysulfone, and polyurethane. At this time, the polyvinylidene fluoride-based polymer includes at least one of polyvinylidene fluoride, poly(vinylidene fluoride-co-hexa fluoropropylene), poly(vinylidene fluoride-co-trifluoroethylene), and poly(vinylidene fluoride-co-tetrafluoroethylene), the acrylonitrile-based polymer derivative includes at least one of a copolymer of acrylonitrile and methylmethacrylate and polyacrylonitrile, and the acrylate-based polymer may include at least one of polymethylmethacrylate, polyethylacrylate, polyethylmethacrylate, polybutylacrylate, and polybutylmethacrylate.

In even other embodiments, the gel-type electrolyte may include a lithium salt. The lithium salt may be at least one of lithium perchlorate ($LiClO_4$), lithium triplate ($LiCF_3SO_3$), lithium hexafluorophosphate ($LiPF_6$), lithium tetrafluoroborate ($LiBF_4$), lithium trifluoromethanesulfonyl imide ($LiN(CF_3SO_2)_2$), and a combination thereof. In addition, the polymer electrolyte layer may further include an inorganic additive. The inorganic additive may be at least one of silica, talc, alumina ($Al_2O_3$), $TiO_2$, clay, zeolite, and a combination thereof.

In yet other embodiments, at least one of the cathode and anode pouches may have an inner layer having hydrophilicity by a surface treatment. At this time, the cathode conductive carbon layer or the anode conductive carbon layer may be coated on a surface-treated surface of the inner layer. Meanwhile, at least one of the cathode and anode pouches may further include an outer layer and an intermediate layer disposed between the inner layer and the outer layer. The outer layer and the inner layer are polymer film layers and the intermediate layer may be a metal layer or a mixed layer of a metal and a polymer film.

In further embodiments, the inner layer may be formed of at least one of amorphous polypropylene (c-PP), polyethylene, ethylene vinyl acetate (EVA), ethylene vinyl alcohol (EVOH), and a combination thereof. The external layer may be formed of at least one of polyethylene terephthalate, polybuthylene terephthalate, nylon, high density polyethylene (HDPE), oriented polypropylene (o-PP), polyvinyl chloride, polyimide, polysulfone, and a combination thereof. Also, the metal layer for the intermediate layer is at least one of aluminum, copper, stainless steel, and a respective alloy thereof, and the polymer film for the intermediate layer may be at least one of polyester, high density polyethylene, polyvinyl chloride, polyimide, Teflon, and a blend thereof.

In still further embodiments, the cathode conductive carbon layer and the anode conductive carbon layer may respectively include conductive carbon and polymer binder, and a weight ratio between the conductive carbon and the polymer binder may be about 8.5:1 to about 9.9:0.1. The conductive carbon may be at least one of graphite, hard carbon, soft carbon, carbon fibers, carbon nanotubes, carbon black, acetylene black, Ketjen black, and a combination thereof, the polymer binder is at least one of polyvinylidene fluoride, poly(vinylidene fluoride-co-hexa fluoropropylene), polyvinyl chloride, a cellulose-based polymer, polyethylene, polypropylene, ethylene vinyl acetate, polyvinyl alcohol, and a combination thereof, and the cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

In even further embodiments, the cathode layer includes a cathode active material, a conductive material and a binder, and the anode layer may include an anode active material, a conductive material and a binder. At this time, the conductive materials of the cathode layer and the anode layer include at least one of graphite, hard carbon, soft carbon, carbon fibers, carbon nanotubes, carbon black, acetylene black, Ketjen black, Lonza carbon, and a combination thereof, the binders of the cathode layer and the anode layer include at least one of polyvinylidene fluoride, poly(vinylidene fluoride-co-hexa fluoropropylene), polyvinyl chloride, a cellulose-based polymer, polyethylene, polypropylene, ethylene vinyl acetate, polyvinyl alcohol, a mixture of styrene/butadiene rubber/carboxymethyl cellulose and a combination thereof, and the cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

The cathode active material may be lithium oxides, a mixture of the lithium oxides, a solid solution of the lithium oxides, or a solid solution of the lithium oxides to which at least one of aluminum, iron, copper, titanium, and magnesium is added, and the lithium oxides may be carbon particle coated nanosize olivine-type lithium iron phosphate ($LiFePO_4$), lithium cobalt oxide ($LiCoO_2$), lithium nickel oxide ($LiNiO_2$), or lithium manganese oxide ($LiMn_2O_4$).

The anode active material may be at least one of a carbon-based material or a non-carbon-based material. The carbon-based material may include at least one of graphite, hard carbon, and soft carbon, and the non-carbon-based material may include at least one of tin, silicon, lithium titanium oxide ($Li_xTiO_2$) nanotubes and carbon particle coated spinel lithium titanium oxide ($Li_4Ti_5O_{12}$).

In yet further embodiments, a weight ratio between the cathode active material, the conductive material, and the binder for the cathode layer may be about 8:1:1 to about 9.8:0.1:0.1, and a weight ratio between the anode active material, the conductive material, and the binder for the anode layer may be about 8:1:1 to about 9.8:0.1:0.1.

In much further embodiments, the cathode layer includes a cathode active material, a conductive material, and a binder, and the anode layer may be a lithium foil.

In still much further embodiments, the cathode pouch and the anode pouch may include inner layers directly contacted by heat fusion.

In even much further embodiments, the pouch-type flexible film battery may further include cathode and anode terminals that are connected to the cathode conductive carbon layer and the anode conductive carbon layer, respectively.

In yet much further embodiments of the present invention, a method of manufacturing a pouch-type flexible film battery includes forming an adhesive gel polymer electrolyte layer. The method may include: forming a cathode structure including a cathode conductive carbon layer and a cathode layer sequentially stacked on a first film; forming an anode structure including an anode conductive carbon layer and an anode layer sequentially stacked on a second film; forming a gel-type electrolyte layer including a cellulose-based polymer on at least one of the cathode and anode structures; and then bonding the cathode and anode structures. The bonding of the cathode and anode structures may include bonding the cathode layer and the anode layer to the gel-type electrolyte layer by using the gel-type electrolyte layer as an adhesive layer while the first and second films are fused by using heat fusion technology.

In some embodiments, the method of manufacturing the pouch-type flexible film battery may be performed by using a roll-to-roll system. The roll-to-roll system may be configured to continuously perform the forming of the cathode and anode structures, the forming of the gel-type electrolyte, and the bonding of the cathode and anode structures.

In other embodiments, at least one time drying may be further performed. For example, the drying may be performed after forming at least one of the cathode conductive carbon layer, the cathode layer, the anode conductive carbon layer, and the anode layer.

In still other embodiments, the cathode conductive carbon layer, the cathode layer, the anode conductive carbon layer, and the anode layer may be formed by using screen printing technology.

In even other embodiments, the forming of the gel-type electrolyte layer may include: providing an electrolyte solution including a polymer matrix and a liquid electrolyte dissolved in a cosolvent; coating the electrolyte solution on at least one of the cathode and anode structures; and then drying the cosolvent. At this time, the polymer matrix includes a cellulose-based polymer and a strength reinforced polymer, and the liquid electrolyte may include a lithium salt.

In yet other embodiments, the cosolvent may be at least one of N-methylpyrrolidone (NMP), D-methylformamide (DMF), dimethylacetamide (DMAc), acetone, ethanol, methanol, propanol, ethyleneglycol, diethylene glycol monobutyl ether, diethylene glycol diethyl ether, diethylene glycol butylvinyl ether, diethylene glycol monododecyl ether, diethylene glycol monohexadecyl ether, diethylene glycol monohexyl ether, diethylene glycol monooctyl ether, diethylene glycol monooctadecyl ether, diethylene glycol monophenyl ether, diethylene glycol monopropyl ether, and a combination thereof.

In further embodiments, the providing of the electrolyte solution may further include adding an inorganic additive after blending the cellulose-based polymer and the strength reinforced polymer. At this time, the inorganic additive may be at least one of silica, talc, alumina ($Al_2O_3$), $TiO_2$, clay, zeolite, and a combination thereof.

In still further embodiments, surface treating inner surfaces of the first and second films may be further performed in order for the inner surfaces of the first and second films to have hydrophilicity, before the forming of the cathode conductive carbon layer and the anode conductive carbon layer. The surface treating may be performed by at least one method of silicate layer formation through a corona discharge treatment, a plasma treatment, or a flame treatment and oxide coating layer formation through a coating process.

In even further embodiments, the gel-type electrolyte layer may include a first electrolyte layer formed on the cathode structure and a second electrolyte layer formed on the anode structure. In this case, the bonding of the cathode and anode structures may include bonding the first and second electrolyte layers to each other.

In yet further embodiments, the bonding of the cathode and anode structures may be performed under an atmospheric pressure condition. Also, the forming of the cathode conductive carbon layer, the cathode layer, the anode conductive carbon layer, the anode layer, and the gel-type electrolyte layer, and the bonding of the cathode and anode structures may be performed under an atmospheric pressure condition.

In some embodiments, the bonding of the cathode and anode structures includes sealing an inner space where the electrolyte layer is disposed by fusing the first and second films around the electrolyte layer, wherein the electrolyte layer may be formed in the inner space before the sealing of the inner space.

In other embodiments, separating each film battery may be further performed by cutting the fused first and second films, after the boding of the cathode and anode structures.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

The above objects, other objects, features and advantages of the present invention will be better understood from the following description of preferred embodiments taken in conjunction with the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, it will be understood that when a layer (or film) is referred to as being 'on' another layer or substrate, it can be directly on the other layer or substrate, or intervening layers may also be present. Also, in the figures, the dimensions of layers and regions are exaggerated for clarity of illustration. Also, though terms like a first, a second, and a third are used to describe various regions and layers in various embodiments of the present invention, the regions and the layers are not limited to these terms. These terms are used only to discriminate one region or layer from another region or layer. Therefore, a layer referred to as a first layer in one embodiment can be referred to as a second layer in another embodiment. An embodiment described and exemplified herein includes a complementary embodiment thereof.

Figure 1:
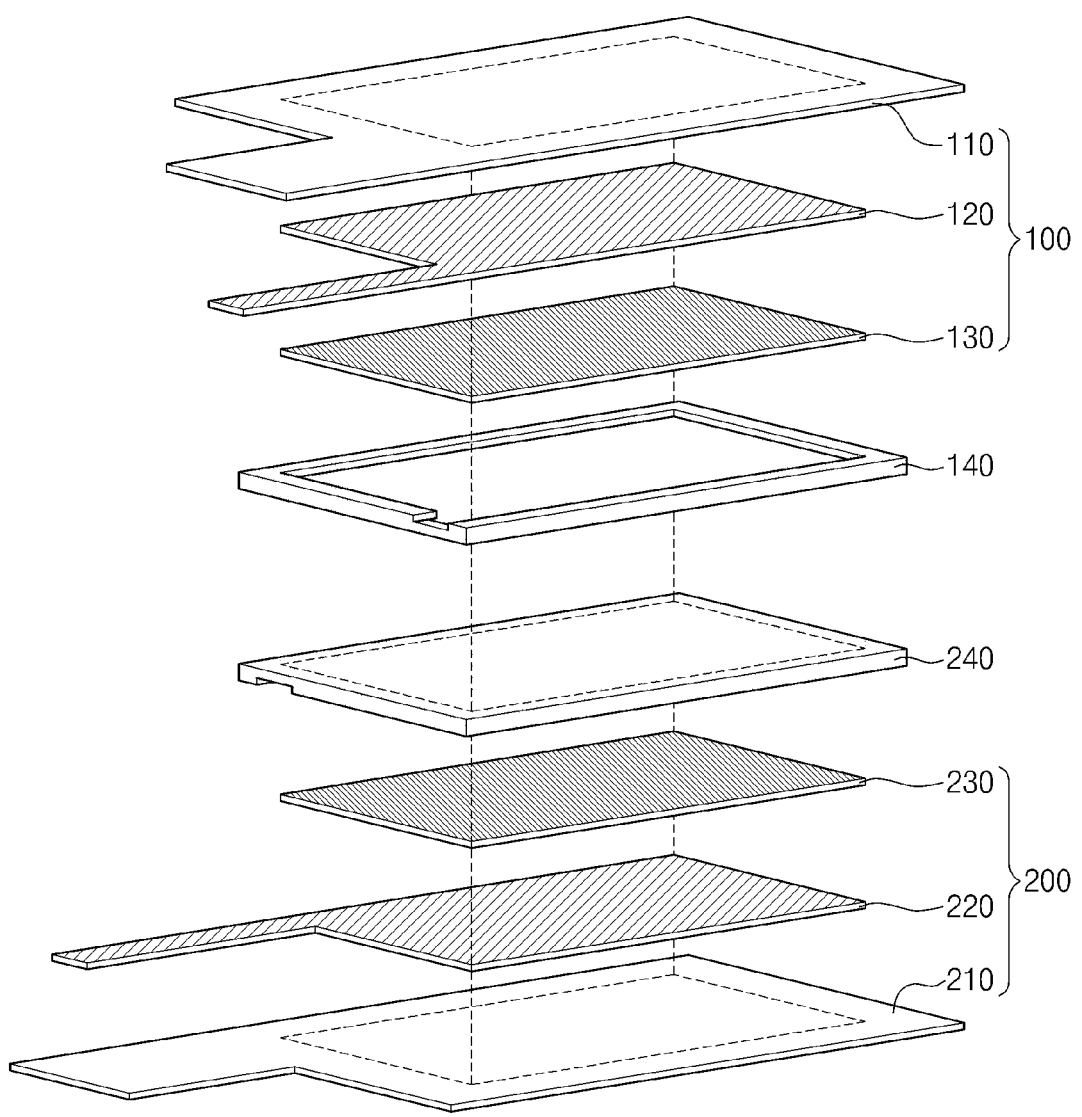
FIG. 1 is a perspective view exemplary illustrating a pouch-type flexible film battery according to some embodiments of the present invention.
Figure 2:
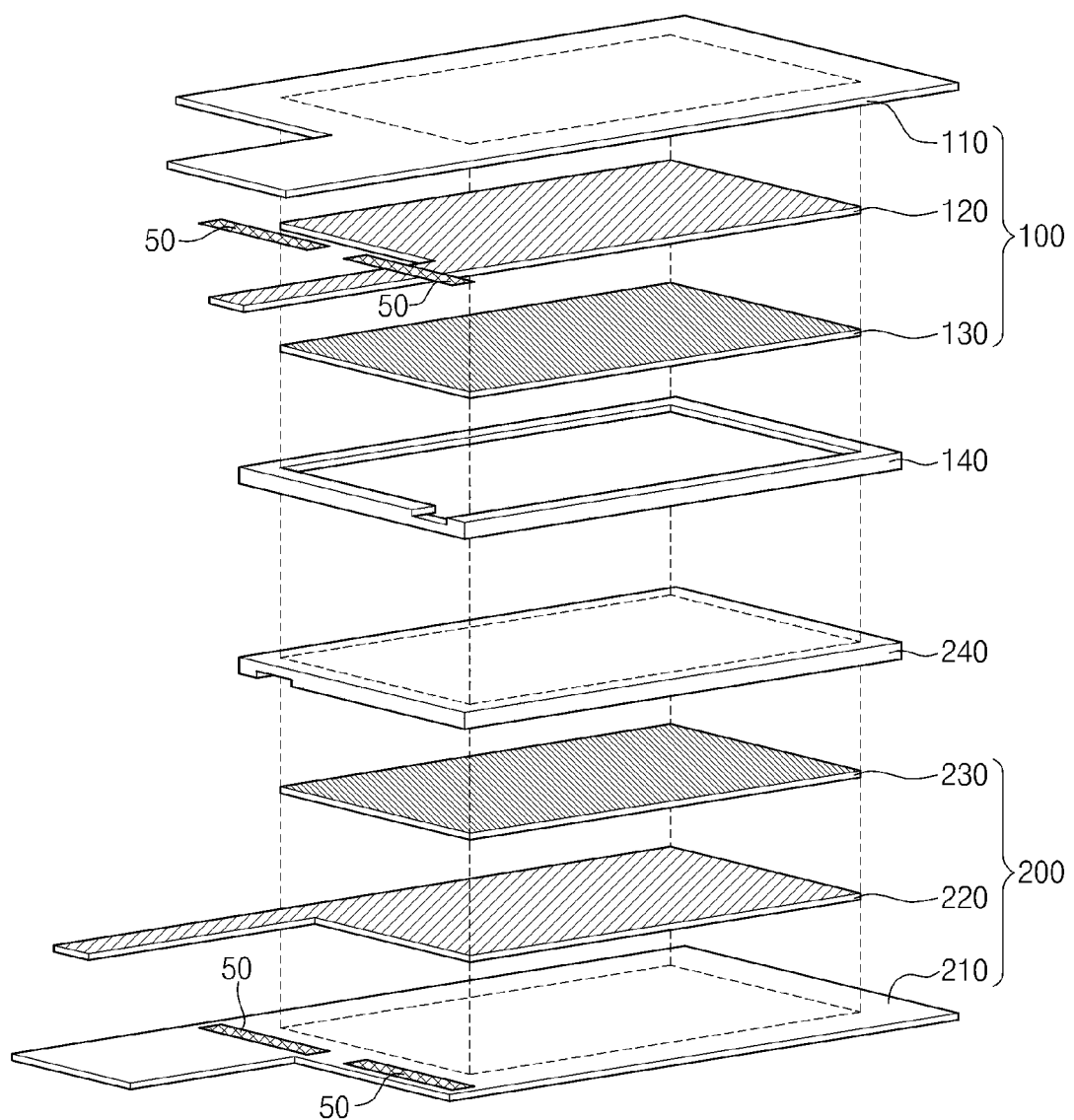
FIG. 2 is a perspective view exemplary illustrating a pouch-type flexible film battery according to modified embodiments of the present invention.

FIG. 1 is a perspective view exemplary illustrating a pouch-type flexible film battery according to some embodiments of the present invention. FIG. 2 is a perspective view exemplary illustrating a pouch-type flexible film battery according to modified embodiments of the present invention.

Referring to FIG. 1, the pouch-type flexible film battery according to some embodiments of the present invention may include an anode structure 100, a cathode structure 200 and at least one of polymer electrolyte layers 140 and 240 disposed therebetween. The anode structure 100 includes an anode conductive carbon layer 120 and an anode layer 130 sequentially stacked on an anode pouch film 110. The cathode structure 200 may include a cathode conductive carbon layer 220 and a cathode layer 230 sequentially stacked on a cathode pouch film 210.

The polymer electrolyte layers 140 and 240 may include a first polymer electrolyte layer 140 to which the anode layer 130 adheres and a second polymer electrolyte layer 240 to which the cathode layer 230 adheres. The first and second polymer electrolyte layers 140 and 240 adhere to each other and may form one polymer electrolyte layer.

According to embodiments of the present invention, the anode and cathode pouch films 110 and 210 are fused together around the polymer electrolyte layers 140 and 240 to seal the polymer electrolyte layers 140 and 240, the anode and cathode conductive carbon layers 120 and 220, the anode layer 130, and the cathode layer 230. For this purpose, the anode and cathode pouch films 110 and 210 may be formed of a material capable of providing vacuum sealing and heat fusion characteristics together as will be described with reference to FIG. 3.

The pouch-type flexible film battery according to the present invention have anode and cathode terminals connected to the anode and cathode conductive carbon layers 120 and 220, respectively. The anode and cathode terminals may be used as paths for supplying electrical energy stored in the pouch-type flexible film battery according to the present invention to an external electronic device. According to some embodiments of the present invention, the anode and cathode conductive carbon layers 120 and 220 are extended to function as the anode and cathode terminals. In this case, the anode and cathode terminals are formed of a non-metallic material (i.e., the anode and cathode conductive carbon layers 120 and 220). However, according to other embodiments of the present invention, the anode and cathode terminals may be a metallic material formed separately.

According to modified embodiments of the present invention, sealants 50 for improving vacuum sealing characteristics may be further formed between the anode and cathode conductive carbon layers 120 and 220 and the anode and cathode pouch films 110 and 210 as illustrated in FIG. 2. The sealants 50 may be formed to cross the anode and cathode terminals. According to some embodiment of the present invention, the sealant 50 may be a material that is fusible through a thermal method (e.g., hot melting films). Polyethylene, amorphous polypropylene (c-PP), ethylene vinyl acetate (EVA) or ethylene vinyl alcohol (EVOH) may be used as the hot melting films. According to other embodiments of the present invention, since the anode and cathode pouch films 110 and 210 are formed of a material capable of providing vacuum sealing and heat fusion characteristics together, the anode and cathode terminals may be directly sealed by the anode and cathode pouch films 110 and 210 without the sealants 50 as illustrated in FIG. 1.

Hereinafter, technical characteristics related to components constituting the anode and cathode structures 100 and 200, and the polymer electrolyte layer 300 will be described in detail with reference to FIGS. 3 through 7.

Figure 3:
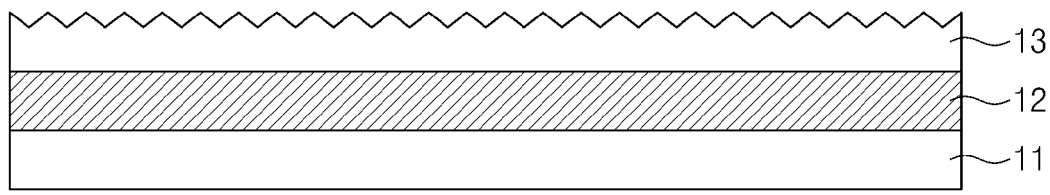
FIG. 3 is a cross-sectional view exemplary illustrating a pouch film according to embodiments of the present invention.

FIG. 3 is a cross-sectional view exemplary illustrating a pouch film according to embodiments of the present invention.

A pouch film 10, which will be described with reference to FIG. 3 below, may be used as the anode and cathode pouch films 110 and 210. The pouch film 10 has vacuum sealing and heat fusion characteristics together. According to some embodiments of the present invention, the pouch film 10 may include a plurality of layers formed of a metal/polymer composite layer or a polymer composite layer. For example, as illustrated in FIG. 3, the pouch film 10 may be a triple-layer structure having an external layer 11, an intermediate layer 12, and an inner layer 13. At least two of the external layer 11, the intermediate layer 12, and the inner layer 13 may be a different material from each other.

The external layer 11 may be a polymer film selected from the group consisting of polyethylene terephthalate, polybuthylene terephthalate, nylon, high density polyethylene (HDPE), oriented polypropylene (o-PP), polyvinyl chloride, polyimide, polysulfone, and a combination thereof. The thickness of the external layer 11 may be in a range of about 5 µm to about 50 µm. The intermediate layer 12 may be formed to a thickness of about 5 µm to about 50 µm, and may include at least one of metallic materials or non-metallic materials. Examples of the metallic materials for the intermediate layer 12 may be aluminum, copper, stainless steel, and respective alloys thereof. Examples of the non-metallic materials for the intermediate layer 12 may be polyester, high density polyethylene, polyvinyl chloride, polyimide, Teflon, and blends thereof.

The inner layer 13 may be a polymer film formed to a thickness of about 5 µm to about 50 µm. For example, the inner layer 13 may be formed of a polymer film selected from the group consisting of amorphous polypropylene (c-PP), polyethylene, ethylene vinyl acetate (EVA), ethylene vinyl alcohol (EVOH), and a combination thereof.

Since some of materials exemplified for the inner layer 13 (e.g., polypropylene) have low surface energy and hydrophobic characteristics, it may be difficult to directly coat the anode or cathode conductive carbon layer 120 or 220 on the inner layer 13. The difficulty in the coating process may be due to the fact that polypropylene does not have compatibility or miscibility with respect to most polar polymer materials used as a binder for an electrode slurry.

In addition to the difficulty in the coating, the anode or cathode conductive carbon layer 120 or 220 may be easily delaminated from the pouch film 10 even after the coating because of the low surface energy and hydrophobicity. Since the delamination makes a gap between the anode or the cathode conductive carbon layer 120 or 220 and the pouch film 10, technical limitations, which are fatal to the performance of a product or product life, such as the leakage or drying of an electrolyte may be generated. In particular, the delamination may be easily generated because there may be an external force by a user with respect to flexible devices. For this reason, it is particularly necessary to prevent the delamination between the anode or the cathode conductive carbon layer 120 or 220 and the pouch film 10 in a flexible battery technology field.

According to some embodiments of the present invention, the inner layer 13 may have a surface-treated upper surface, and the anode or cathode conductive carbon layer 120 or 220 may be coated on the surface-treated upper surface. The surface treatment may be performed to solve the difficulty in the coating and delamination. For example, a surface of the inner layer 13 may have hydrophilicity by the surface treatment. The surface treatment may be performed through at least one method of a silicate layer formation through a corona discharge treatment, a plasma treatment, or a flame treatment, and an oxide coating layer formation through a coating process, but the surface treatment is not limited thereto and may be performed through other micro-roughness layer forming technologies. According to some embodiments of the present invention, the surface-treated upper surface of the inner layer 13 may have a surface energy of at least about 50 mN/m or more measured through a test ink measurement method by the surface treatment.

Figure 4:
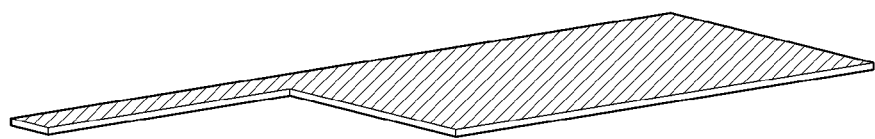
FIG. 4 is a cross-sectional view exemplary illustrating a conductive carbon layer according to embodiments of the present invention.

FIG. 4 is a cross-sectional view exemplary illustrating a conductive carbon layer according to embodiments of the present invention. A conductive carbon layer 20 described with reference to FIG. 4 may be used at least one of the anode and cathode conductive carbon layers 120 and 220. The pouch film 10 coated with the conductive carbon layer 20 may constitute a cathode or an anode current collector in the pouch-type flexible film battery according to embodiments of the present invention.

Referring to FIG. 4, the conductive carbon layer 20 may include conductive carbon and polymer binder. The conductive carbon may be at least one of graphite, hard carbon, soft carbon, carbon fibers, carbon nanotubes, carbon black, acetylene black and Ketjen black. The polymer binder may be at least one of polyvinylidene fluoride, poly(vinylidene fluoride-co-hexa fluoropropylene), polyvinyl chloride, a cellulose-based polymer, polyethylene, polypropylene, ethylene vinyl acetate, polyvinyl alcohol, and a combination thereof. The cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose. According to some embodiments of the present invention, a ratio of usage between the conductive carbon and the polymer binder may be about 8.5:1 to about 9.9:0.1 in a weight ratio, but technical idea of the present invention is not limited to the exemplified numerical range.

According to some embodiments, thickness of the pouch film 10 or the cathode or anode pouch film 110 or 210 may be about 50 μm to about 180 μm, and thickness of the conductive carbon layer 20 or the anode or cathode conductive carbon layer 120 or 220 may be about 1 μm to about 30 μm.

Figure 5:
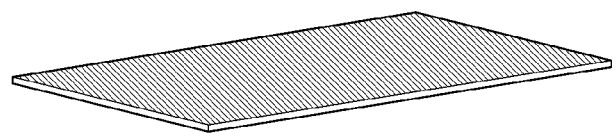
FIG. 5 is a cross-sectional view exemplary illustrating a cathode layer according to some embodiments of the present invention.

FIG. 5 is a cross-sectional view exemplary illustrating a cathode layer according to some embodiments of the present invention.

Referring to FIG. 5, the cathode layer 230 is coated on the cathode conductive carbon layer 220 as illustrated in FIGS. 1 and 2, and may include a cathode active material, a conductive material and a binder.

The cathode active material may be one of lithium oxides, mixtures of lithium oxides and solid solutions of lithium oxides. According to some embodiments, the lithium oxide for the cathode active material may be carbon particle coated nanosize olivine-type lithium iron phosphate ($LiFePO_4$), lithium cobalt oxide ($LiCoO_2$), lithium nickel oxide ($LiNiO_2$), or lithium manganese oxide ($LiMn_2O_4$). The lithium oxides except for the olivine-type lithium iron phosphate may be formed to have a particle size of about 1 μm to about 100 μm. According to some embodiments, the cathode active material may be provided as a solid solution of lithium compounds to which metal elements such as aluminum, iron, copper, titanium, or magnesium are added.

The conductive material may be at least one of graphite, hard carbon, soft carbon, carbon fibers, carbon nanotubes, carbon black, acetylene black, Ketjen black, Lonza carbon, and a combination thereof. The binder may include at least one of polyvinylidene fluoride, poly(vinylidene fluoride-co-hexa fluoropropylene), polyvinyl chloride, a cellulose-based polymer, polyethylene, polypropylene, ethylene vinyl acetate, polyvinyl alcohol, a mixture of styrene/butadiene rubber/carboxymethyl cellulose and a combination thereof. The cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

A weight ratio between the cathode active material, the conductive material, and the binder forming the cathode layer 230 is about 8:1:1 to about 9.8:0.1:0.1, and the cathode layer 230 may be formed to a thickness of about 30 μm to about 150 μm. However, the technical spirit of the present invention is not limited to the exemplified weight ratio or thickness and may be variously modified.

Figure 6:
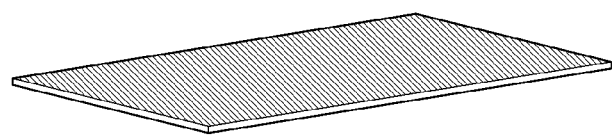
FIG. 6 is a cross-sectional view exemplary illustrating an anode layer according to some embodiments of the present invention.

FIG. 6 is a cross-sectional view exemplary illustrating an anode layer according to some embodiments of the present invention.

Referring to FIG. 6, according to some embodiments, the anode layer 130 may be provided in a lithium foil shape. In this case, the anode layer 130 may adhere on the anode conductive carbon layer 120 through a method such as a compressing process.

According to other embodiments, the anode layer 130 may include a carbon-based or non-carbon-based material coated on the anode conductive carbon layer 120. For example, the anode layer 130 may include a carbon-based or non-carbon-based anode active material, a conductive material, and a binder. The carbon-based anode active material includes at least one of graphite, hard carbon, and soft carbon, and the non-carbon-based anode active material may include at least one of tin, silicon, and lithium titanium oxide. In addition, the lithium titanium oxide for the non-carbon-based anode active material may be lithium titanium oxide ($Li_xTiO_2$) nanotubes or carbon particle coated spinel lithium titanium oxide ($Li_4Ti_5O_{12}$).

The conductive material and the binder for the anode layer 130 may include at least one of the exemplified materials for the conductive material and binder for the cathode layer 230 described with reference to FIG. 5, respectively. That is, the conductive material for the anode layer 130 may be at least one of graphite, hard carbon, soft carbon, carbon fibers, carbon nanotubes, carbon black, acetylene black, Ketjen black, Lonza carbon, and a combination thereof. The binder for the anode layer 130 may include at least one of polyvinylidene fluoride, poly(vinylidene fluoride-co-hexa fluoropropylene), polyvinyl chloride, a cellulose-based polymer, polyethylene, polypropylene, ethylene vinyl acetate, polyvinyl alcohol, a mixture of styrene/butadiene rubber/carboxymethyl cellulose and a combination thereof. The cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose. Also, a weight ratio between the anode active material, the conductive material, and the binder forming the anode layer 130 is about 8:1:1 to about 9.8:0.1:0.1.

The anode layer 130 may be formed to a thickness of about 15 μm to about 150 μm. According to some embodiments, the thickness of the anode layer 130 may be a half of the thickness of the cathode layer 230.

Figure 7:
FIG. 7 is a cross-sectional view exemplary illustrating a polymer electrolyte layer according to some embodiments of the present invention.

FIG. 7 is a cross-sectional view exemplary illustrating a polymer electrolyte layer according to some embodiments of the present invention.

Referring to FIG. 7, a polymer electrolyte layer 40 may be a gel-type polymer electrolyte having an adhesive property. According to some embodiments, the gel-type polymer electrolyte may be a polymer material in which a lithium salt, a cellulose-based polymer, and a strength reinforced polymer are mixed. Also, the polymer electrolyte layer 40 may be formed to have a thickness of about 5 μm to about 150 μm.

According to some embodiments, the lithium salt for the polymer electrolyte layer 40 may be at least one of lithium perchlorate ($LiClO_4$), lithium triplate ($LiCF_3SO_3$), lithium hexafluorophosphate ($LiPF_6$), lithium tetrafluoroborate ($LiBF_4$), lithium trifluoromethanesulfonyl imide ($LiN(CF_3SO_2)_2$), and a combination thereof.

According to one aspect of the present invention, the polymer electrolyte layer 40 may have the foregoing adhesive property by means of the cellulose-based polymer, and may have improved mechanical strength and improved forming property by means of the strength reinforced polymer. A weight ratio between the cellulose-based polymer and the strength reinforced polymer may be about 1:999 to about 999:1. According to some embodiments, the weight ratio may be about 1:99 to about 99:1.

According to some embodiments, the cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

According to some embodiments, the strength reinforced polymer may be a polyvinylidene fluoride-based polymer. For example, the strength reinforced polymer may be at least one of polyvinylidene fluoride, poly(vinylidene fluoride-co-hexa fluoropropylene), poly(vinylidene fluoride-co-trifluoroethylene), and poly(vinylidene fluoride-co-tetrafluoroethylene).

According to other embodiments, the strength reinforced polymer may be at least one of a polyvinylchloride derivative, an acrylonitrile-based polymer derivative, polyvinyl acetate, polyvinyl alcohol, polyimide, polysulfone, and polyurethane. The acrylonitrile-based polymer derivative may be at least one of a copolymer of acrylonitrile and methylmethacrylate and polyacrylonitrile, and the acrylate-based polymer may be at least one of polymethylmethacrylate, polyethylacrylate, polyethylmethacrylate, polybutylacrylate, and polybutylmethacrylate.

The polymer electrolyte layer 40 may further include an inorganic additive. For example, the polymer electrolyte layer 40 may be a polymer material in which at least one of silica, talc, alumina ($Al_2O_3$), $TiO_2$, clay, zeolite, and a combination thereof is added as the inorganic additive.

Figure 8:
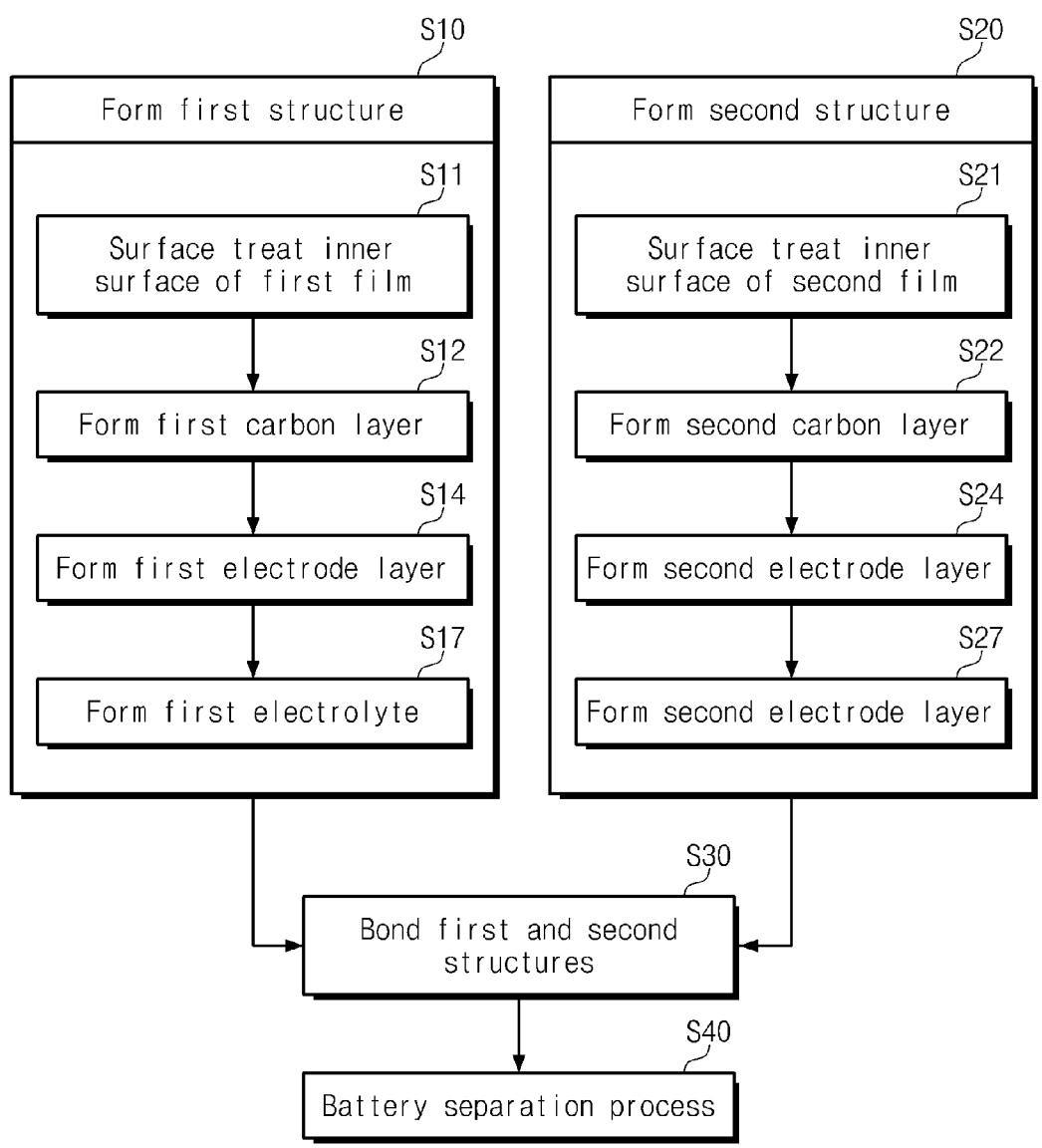
FIGS. 8 and 9 are flowcharts exemplary illustrating methods of manufacturing pouch-type flexible film batteries according to embodiments of the present invention.
Figure 9:
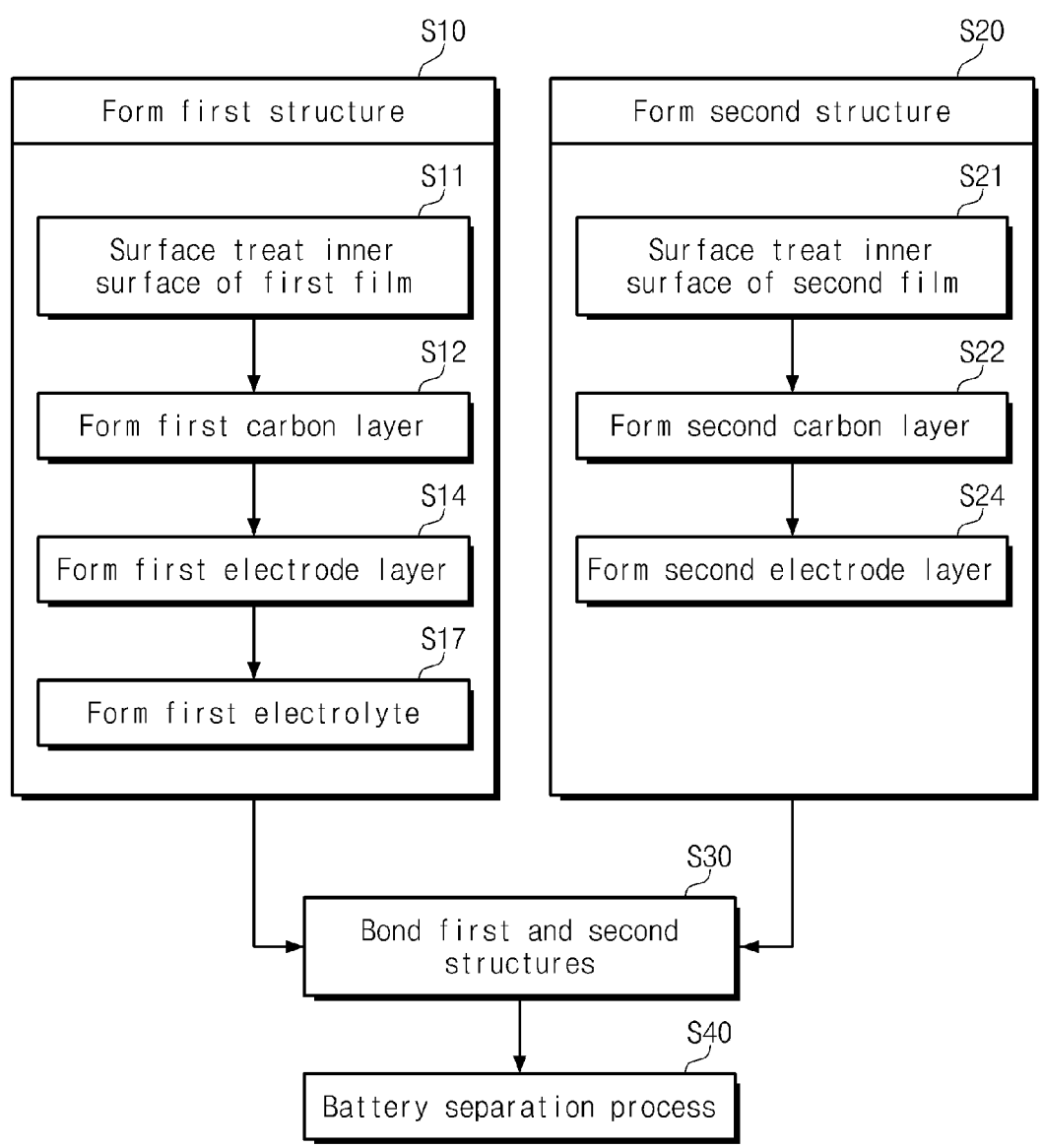
Figure 10:
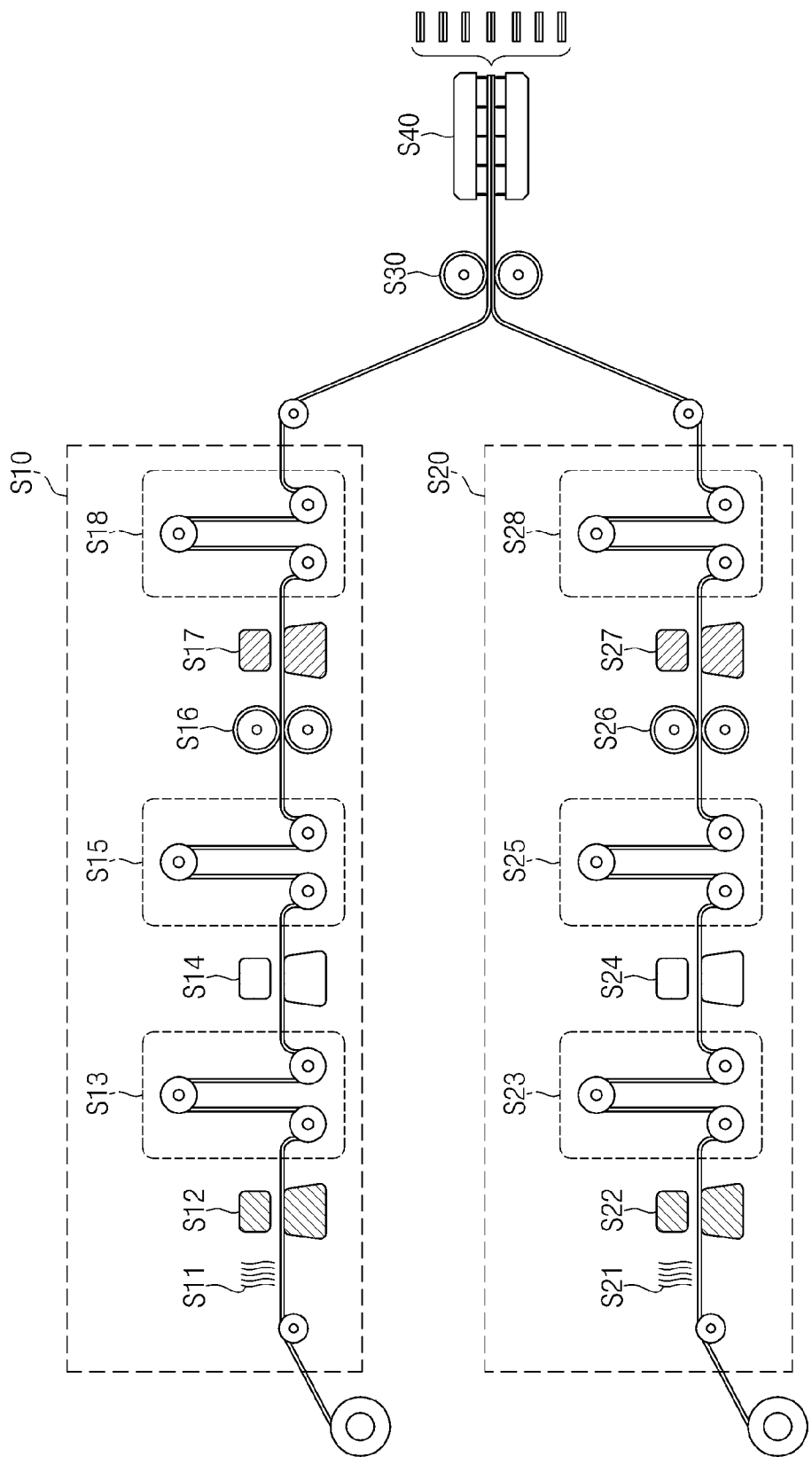
FIGS. 10 and 11 are drawings exemplary illustrating methods of manufacturing pouch-type flexible film batteries according to embodiments of the present invention.
Figure 11:
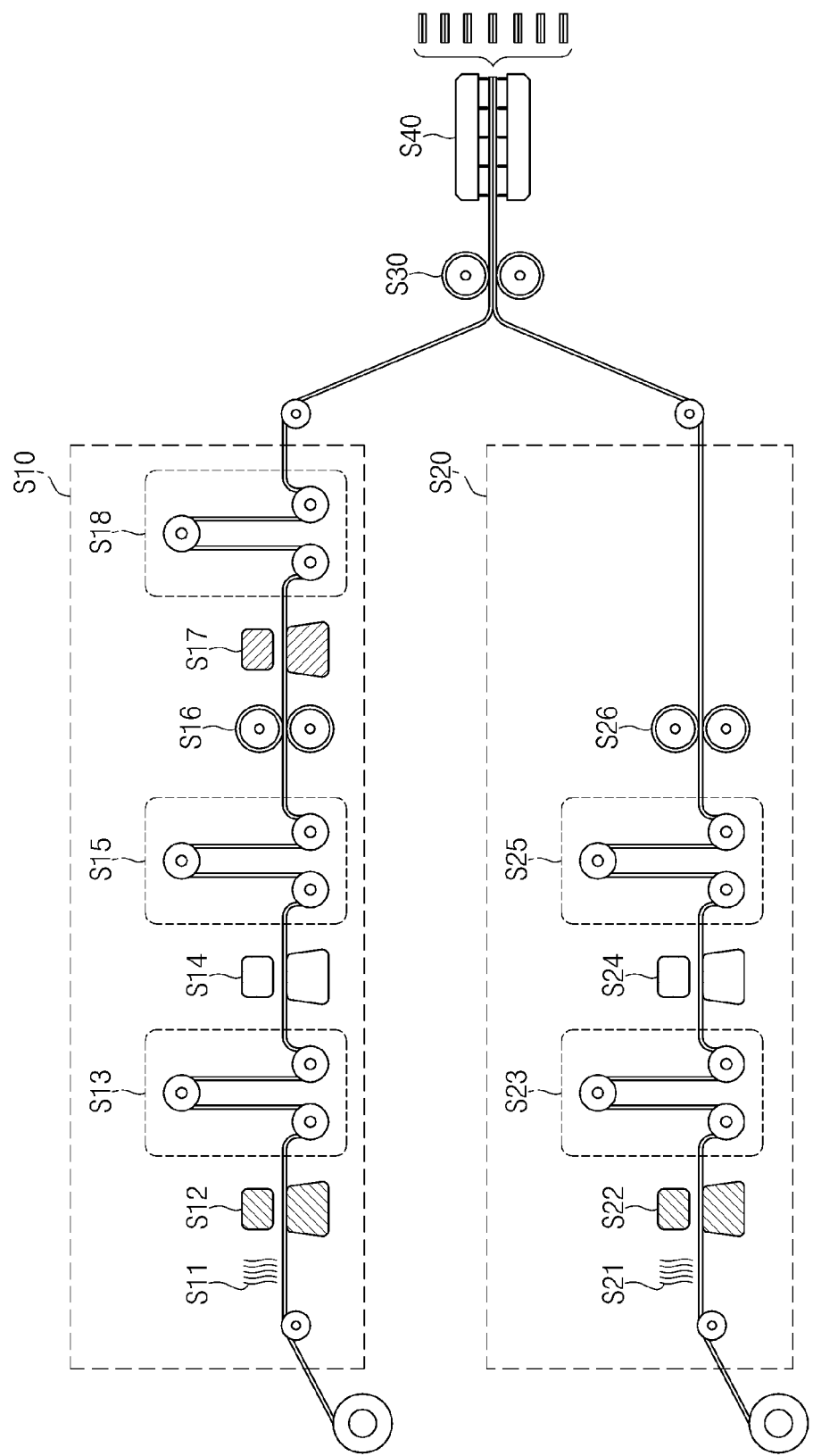

FIGS. 8 and 9 are flowcharts exemplary illustrating methods of manufacturing pouch-type flexible film batteries according to embodiments of the present invention, and FIGS. 10 and 11 are drawings exemplary illustrating methods of manufacturing pouch-type flexible film batteries according to embodiments of the present invention. For the simplicity of the description, the technical characteristics related to the materials of the elements already described with reference to FIGS. 1 through 7 may not be provided in the following description.

Referring to FIGS. 8 to 11, the manufacturing methods include the operations of independently forming a first structure including an anode current collector of the film battery and a second structure including a cathode current collector of the film battery S10 and S20, and then an operation of bonding the first and second structures S30. In addition, the manufacturing methods may further include an operation of separating the battery S40 in which the film batteries are respectively separated by cutting the bonded first and second structures.

The operation S10 of forming the first structure may include the operations of: surface treating one surface of a first film S11; forming a first carbon layer on the surface-treated surface of the first film S12; forming a first electrode layer on the first carbon layer S14; and forming a first electrolyte layer on the first electrode layer S17.

Similarly, the operation S20 of forming the second structure may include the operations of: surface treating one surface of a second film S21; forming a second carbon layer on the surface-treated surface of the second film S22; and forming a second electrode layer on the second carbon layer S24. According to some embodiments, the operation S20 of forming the second structure may further include forming a second electrolyte layer on the second electrode layer S27 as illustrated in FIGS. 8 and 10. However, according to other embodiments, an operation of forming one of the first and second electrolyte layers may be omitted. For example, as illustrated in FIGS. 9 and 11, in the operation S20 of forming the second structure, the operation S27 of forming the second electrolyte layer on the second electrode layer may be omitted.

According to some embodiments, the first and second films may be the pouch film 10 described with reference to FIG. 3, the first and second carbon layers may be the conductive carbon layer 20 described with reference to FIG. 4, and the first and second electrode layers may be the anode layer 130 and the cathode layer 230 described with reference to FIGS. 6 and 5, respectively. Also, the first and second electrolyte layers may be the polymer electrolyte layer 40 described with reference to FIG. 7.

The operations S11 and S21 of surface treating the first and second films may be performed to make surfaces, on which the first and second carbon layers will be formed, hydrophilic. For example, the operations S11 and S21 of surface treating may be performed by at least one method of silicate layer formation through a corona discharge treatment, a plasma treatment, or a flame treatment and oxide coating layer formation through a coating process. The operations S11 and S21 of surface treating are not limited to the exemplified methods and may be performed through other micro-roughness layer forming technologies.

According to some embodiments, the first and second films may include cast polypropylene layer, and the operations S11 and S21 of surface treating may be performed on the cast polypropylene layer. In this case, according to the experiments of the inventors, a cast polypropylene layer surface treated by using a corona discharge method may have a surface energy of about 60 mN/m or more using a test ink measurement method. According to embodiments of the present invention, the operations S11 and S21 of surface treating may be performed to allow a layer to have a surface energy of at least about 50 mN/m. According to the operations S11 and S21 of surface treating, the first and second carbon layers may be coated easily on the first and second films and delamination between the carbon layers and the pouch film may also be alleviated.

The first and second carbon layers, the first and second electrode layers, and the first and second electrolyte layers may be formed by using screen printing technology. By using the screen printing technology, the foregoing layers may be locally formed at predetermined regions of the first and second films. The screen printing technology is only exemplified as an economical method capable of locally forming the first and second carbon layers, the first and second electrode layers, and the first and second electrolyte layers. That is, the technical spirit of the present invention is not limited to the use of the screen printing technology and may be embodied by using other various pattern forming methods.

In the operation S30 of bonding the first and second structures (hereinafter, referred to as the 'bonding operation'), the first and second electrolyte layers may be bonded to face to each other. That is, the bonding operation 30 may be performed to dispose the first and second electrolyte layers between the first and second films. In the case of the embodiments described with reference to FIGS. 9 and 11, the first and second electrode layers may respectively adhere to two surfaces of the first electrolyte layer facing to each other because the second electrolyte layer is omitted.

According to some embodiments, the bonding operation 30 may be performed under a pressure condition lower than the atmospheric pressure. However, according to other embodiments, the bonding operation S30 may be substantially preformed under the atmospheric pressure condition.

Meanwhile, the decompression condition causes a delay in process time for decompression as well as requiring an additional vacuum facility. Thus, a manufacturing method requiring a decompression method may be incompatible with a roll-to-roll system. Alternatively, in the case of embodiments performed under the atmospheric pressure condition, application of the roll-to-roll system is facilitated because the delay in process time for decompression is not generated.

According to some embodiments, as illustrated in FIGS. 10 and 11, the bonding operation S30 may be performed by a rolling method using a pair of rollers. In addition, the bonding operation S30 may be performed under a temperature condition (e.g., above about 100° C.) enabling to fuse inner layers 13 of the pouch film 10 together. That is, the pouch films 10 may be sealed by using a heat fusion method.

As described with reference to FIG. 7, the first and second electrolyte layers may be gel polymer electrolytes having an adhesive property. Since the adhesive gel polymer electrolytes are used, the bonding operation S30 may be performed under the atmospheric pressure condition. That is, when the electrolyte in a liquid phase is injected into the pouch, the rolling method as illustrated in FIGS. 10 and 11 may not be used in the bonding operation S30. In addition, when the rolling method may not be used, it is required to perform the bonding operation S30 by using a separate decompression facility in order to remove air inside the pouch.

According to one aspect of the present invention, a pouch-type flexible film battery may be manufactured by using a roll-to-roll system. For example, the roll-to-roll system may be formed to continuously perform the operations S10 and S20 of forming the first and second structures and the operation S30 of bonding the first and second structures. That is, a method of manufacturing the film battery may be achieved through a reel-to-reel process.

As illustrated in FIGS. 10 and 11, the first and second films are continuously provided from reels different from each other to facilities for the bonding operation S30 and the battery separating operation S40 through the roll-to-roll system. In this case, the first and second structures are formed on the first and second films through facilities disposed between the reels and the facilities for the bonding operation S30. According to some embodiments, the first and second carbon layers, the first and second electrode layers, and the first and second electrolyte layers may be formed on the first and second films by using a screen printing apparatus. Automation, continuation, and mass production in the manufacturing process may be possible by the foregoing roll-to-roll system and the screen printing apparatus, and as a result, manufacturing cost of the film battery may be reduced.

According to some embodiments, as illustrated in FIGS. 10 and 11, the first and second carbon layers, the first and second electrode layers, and the first and second electrolyte layers are respectively formed, and then drying operations S13, S15, S18, S23, S25 and S28 to dry coated layers may be further performed. In addition, according to some embodiments, operations of rolling the coated layers using predetermined rollers may be further performed. For example, as illustrated in FIGS. 10 and 11, the operations S16 and S26 of rolling may be performed after forming the first and second electrode layers.

Figure 12:
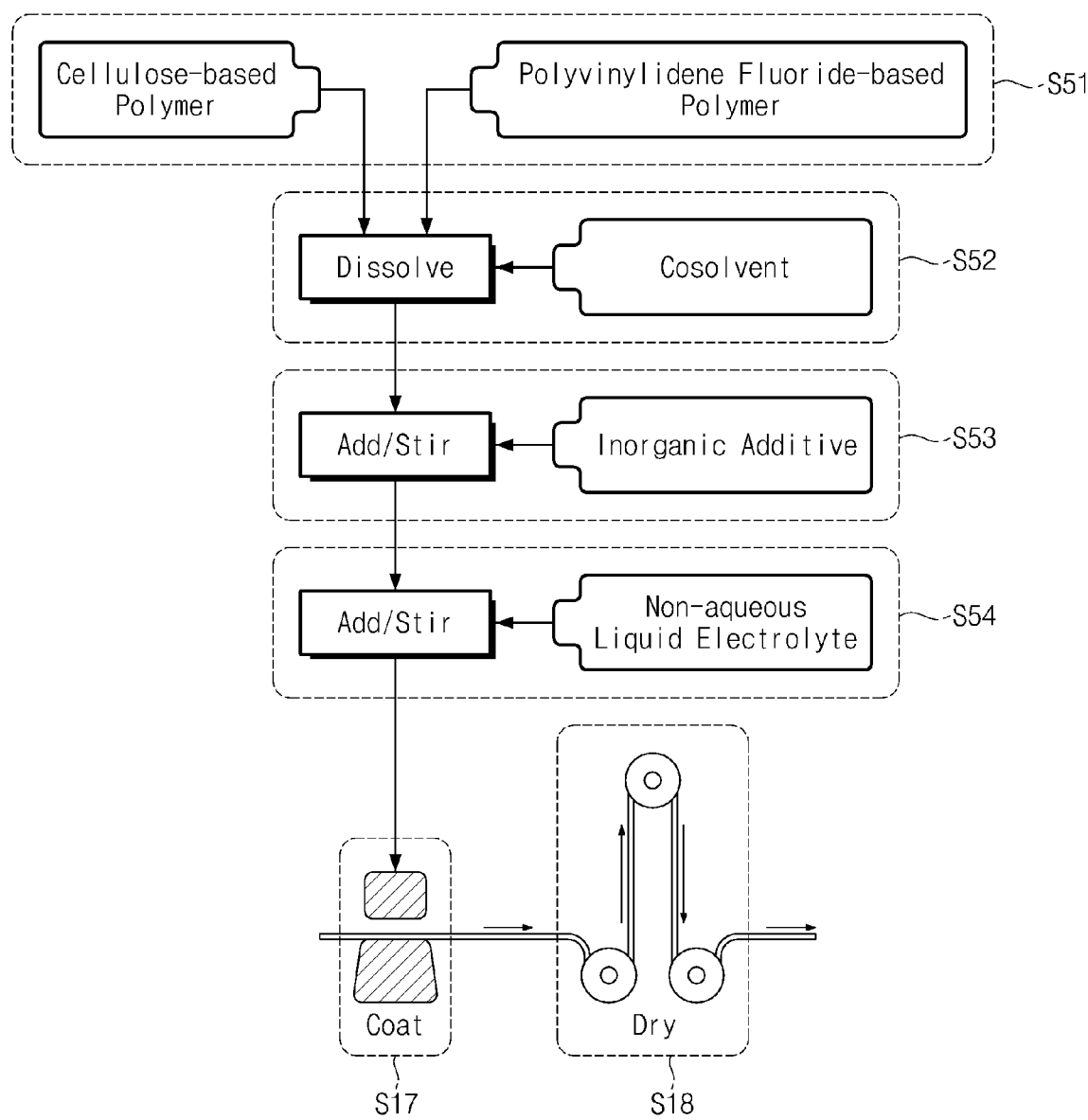
FIG. 12 is a drawing exemplary illustrating a method of forming a polymer electrolyte layer according to an embodiment of the present invention.

FIG. 12 is a drawing exemplary illustrating a method of forming a polymer electrolyte layer according to an embodiment of the present invention.

Referring to FIG. 12, the method may include the operations of: providing a cellulose-based polymer and a strength reinforced polymer S51; dissolving the polymers with a cosolvent S52; and then adding a liquid electrolyte to the product thereof and stirring S54. As a result, an electrolyte solution may be prepared. Thereafter, an operation S17 of coating the electrolyte solution on the first or second film and an operation S18 of drying the product thereof are further performed. The operation S17 of coating the electrolyte solution may be performed by using screen printing technology. The cosolvent evaporates during the operation S18 of drying such that the coated electrolyte solution remains as a gel polymer electrolyte on the first or second film.

According to some embodiments, the cellulose-based polymer may be at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

Also, the strength reinforced polymer may be at least one of a polyvinylidene fluoride-based polymer, a polyvinylchloride derivative, an acrylonitrile-based polymer derivative, polyvinyl acetate, polyvinyl alcohol, polyimide, polysulfone, and polyurethane. The polyvinylidene fluoride-based polymer may be at least one of polyvinylidene fluoride, poly(vinylidene fluoride-co-hexa fluoropropylene), poly(vinylidene fluoride-co-trifluoroethylene), and poly(vinylidene fluoride-co-tetrafluoroethylene), the acrylonitrile-based polymer derivative may be at least one of a copolymer of acrylonitrile and methylmethacrylate or polyacrylonitrile, and the acrylate-based polymer may be at least one of polymethylmethacrylate, polyethylacrylate, polyethylmethacrylate, polybutylacrylate, and polybutylmethacrylate.

According to some embodiments, the cosolvent may be at least one of N-methylpyrrolidone (NMP), D-methylformamide (DMF), dimethylacetamide (DMAc), acetone, ethanol, methanol, propanol, ethyleneglycol, diethylene glycol monobutyl ether, diethylene glycol diethyl ether, diethylene glycol butylvinyl ether, diethylene glycol monododecyl ether, diethylene glycol monohexadecyl ether, diethylene glycol monohexyl ether, diethylene glycol monooctyl ether, diethylene glycol monooctadecyl ether, diethylene glycol monophenyl ether, diethylene glycol monopropyl ether, and a combination thereof. According to other embodiments, the cosolvent may be at least one of ethylene carbonate, propylene carbonate, dimethyl carbonate, diethyl carbonate, ethyl methyl carbonate, tetrahydrofurane, 2-methyltetrahydrofurane, dimethoxyethane, methyl formate, ethyl formate, γ-butyrolactone, and a combination thereof.

According to some embodiments, the liquid electrolyte may include a lithium salt. More particularly, the lithium salt for the liquid electrolyte may be at least one of lithium perchlorate ($LiClO_4$), lithium triplate ($LiCF_3SO_3$), lithium hexafluorophosphate ($LiPF_6$), lithium tetrafluoroborate ($LiBF_4$), lithium trifluoromethanesulfonyl imide ($LiN(CF_3SO_2)_2$), and a combination thereof.

According to some embodiments, an operation S53 of adding an inorganic additive may be further performed in order to improve mechanical strength of the polymer electrolyte layer 40 and/or to improve impregnation and retention characteristics of the liquid electrolyte. The operation S53 of adding the inorganic additive may be performed after an operation S52 of dissolving in which the cosolvent is used, and the inorganic additive may be at least one of silica, talc, alumina ($Al_2O_3$), $TiO_2$, clay, zeolite, and a combination thereof.

The polymer electrolyte layer 40 according to the present invention has excellent adhesion characteristics by including the cellulose-based polymer. Therefore, excellent adhesion characteristics may be maintained even on a surface of a rough and non-uniform inorganic layer as in the electrode. In addition, since the cellulose-based polymer is an electrochemically very stable material, it is not easily decomposed by applied voltage as well as having excellent resistance with respect to radical or electron attack. According to some embodiments, the cellulose-based polymer may be used by mixing with polyvinylidene fluoride (PVDF) or PVDF derivative polymers. According to such embodiments, the electrochemical stability may be further improved.

The polymer electrolyte layer 40 provides excellent ionic conduction characteristics such that electrical properties of the film battery according to the present invention may be improved. More particularly, although viscosity of a polymer medium is rapidly increased by the cellulose-based polymer, it is confirmed as different from general expectations that the polymer electrolyte layer 40 may maintain an excellent ionic conduction characteristic of about $10^{-3}$ S/cm or more at room temperature according to the experiments of the present inventors.

In addition, although the electrolyte solution is directly coated on a surface of the electrolyte layer, the cosolvent included therein does not dissolve or swell the electrode layer after the coating of the electrolyte solution or even in the operation of drying.

Figure 13:
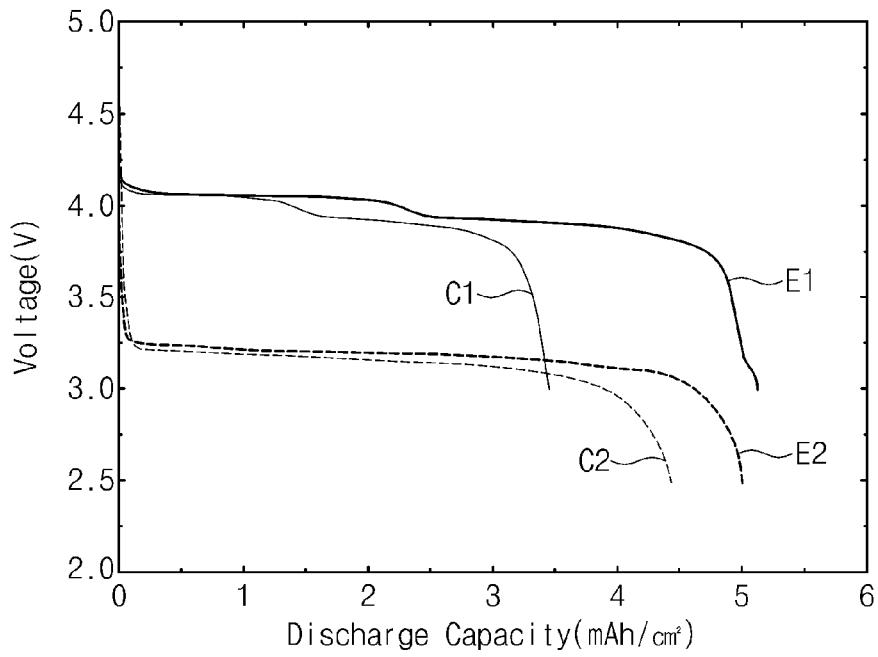
FIGS. 13 through 15 are graphs for illustrating some technical advantages of a pouch-type flexible film secondary battery according to embodiments of the present invention.
Figure 14:
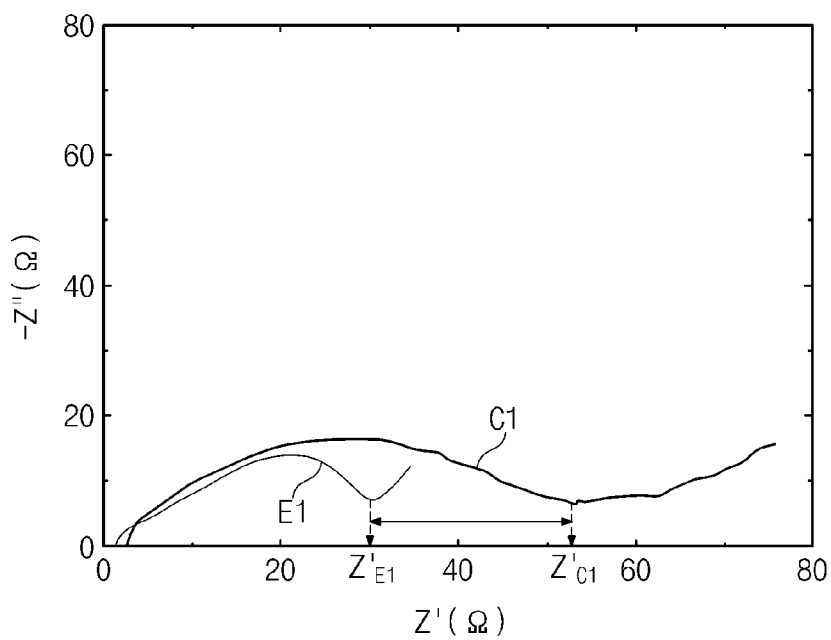
Figure 15:
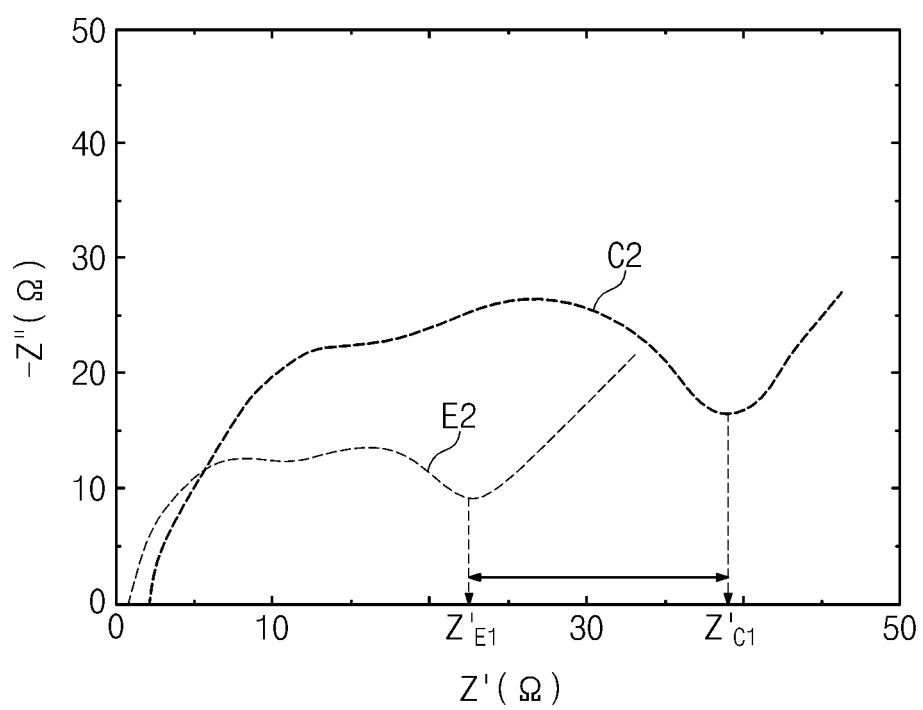

FIGS. 13 through 15 are graphs for illustrating some technical advantages of a pouch-type flexible film secondary battery according to embodiments of the present invention.

The inventors manufactured samples described as Experimental Examples 1 and 2 and samples described as Comparative Examples 1 and 2, and each curve in the graphs shows results measured from the foregoing samples. The curves represented by reference numbers E1 and E2 denote the results measured form the samples (i.e., Experimental Examples 1 and 2) manufactured based on the foregoing technical spirit of the present invention, and the curves represented by reference numbers C1 and C2 denote the results measured form the samples (i.e., Comparative Examples 1 and 2) prepared for comparison with respect to the present invention.

The samples for Experimental Examples 1 and 2 and Comparative Examples 1 and 2 were prepared as below.

Experimental Example 1: 4V Pouch-Type Flexible Film Secondary Battery

About 35 μm thick cast polypropylene, about 30 μm thick aluminum foil, and about 15 μm thick nylon were used as an inner layer, an intermediate layer, and an external layer of a pouch film, respectively. The pouch film was prepared to have a thickness of about 75 μm through a lamination treatment. The inner layer was surface treated by using a corona discharger in air atmosphere in order to have hydrophilicity. In particular, the surface treatment was performed on the inner layer to have a surface energy of about 50 mN/m.

Thereafter, a cathode conductive carbon layer constituting a cathode current collector was formed by coating a highly viscous carbon paste on the inner layer by using a screen printer. The carbon paste was prepared through a process, in which about 5 wt % of ethyl cellulose was dissolved in N-methylpyrrolidone (NMP), and then about 90 wt % of graphite and about 5 wt % of carbon black were added. According to measurements after an operation of drying performed subsequently, a thickness of the cathode conductive carbon layer was about 20 μm, and an area was about 4.3 cm×4.3 cm.

A cathode layer having a thickness of about 100 μm was formed on the cathode conductive carbon layer. The cathode layer was formed through a method of coating an oxide paste by using a screen printer. An NMP solution, in which about 5 wt % of polyvinylidene fluoride was dissolved, was prepared, and then the oxide paste was prepared by mixing a cathode active material, a conductive material, and a binder therewith. About 90 wt % of lithium cobalt oxide (LiCoO$_2$), about 5 wt % of graphite, and about 5 wt % of polyvinylidene fluoride were used as the cathode active material, the conductive material, and the binder, respectively.

An anode current collector was prepared by forming an anode conductive carbon layer on the inner layer of the pouch film. The anode current collector was prepared with the same method as the cathode current collector. Thereafter, about 50 μm thick anode layer was formed on the anode conductive carbon layer. An NMP solution, in which about 5 wt % of polyvinylidene fluoride was dissolved, was prepared, and then a paste for the anode layer was prepared by mixing about 95 wt % of natural graphite as an anode active material and about 5 wt % of polyvinylidene fluoride as a binder therewith.

Gel polymer electrolytes having an adhesive property were formed on the cathode layer and the anode layer by a screen printing method. More particularly, a highly viscous solution including an electrolyte was prepared, and then the solution was coated on the cathode layer and the anode layer by the screen printing method. The gel polymer electrolyte was completed by drying the solution. An NMP solution, in which about 30 wt % of ethyl cellulose was dissolved, was prepared, poly(vinylidene fluoride-co-hexa fluoropropylene) was dissolved therein to obtain about 70 wt %, and about 15 wt % of hydrophobic silica was added based on the blended polymer matrix, and then the highly viscous solution was prepared by adding liquid electrolyte to obtain about 300 wt % based on the blended polymer matrix. Thereafter, the pouch films were disposed to allow the gel polymer electrolytes to face to each other, and then the pouch films were heat fused.

Experimental Example 2: 3V Pouch-Type Flexible Film Secondary Battery

Except for using carbon particle coated olivine-type lithium iron phosphate (LiFePO$_4$) nanoparticles as a cathode active material, a film battery according to Experimental Example 2 was manufactured in the same manner as the film battery of Experimental Example 1.

Comparative Example 1

Except for excluding different points which will be described below, a film battery according to Comparative Example 1 was manufactured to have a structure similar to the film battery according to Experimental Example 1. Cathode and anode current collectors were respectively formed of copper and aluminum, cathode layer and anode layer were respectively formed of lithium cobalt oxide and natural graphite, and nickel and aluminum tabs were respectively used as terminals for electrical connection to cathode and anode. With respect to an electrolyte, poly(vinylidene fluoride-co-hexa fluoropropylene) was used as a polymer matrix. However, different from Experimental Example 1, a cellulose-based polymer was not included in the electrolyte of the sample of Comparative Example 1.

Comparative Example 2

Except for using carbon particle coated olivine-type lithium iron phosphate (LiFePO$_4$) nanoparticles as a cathode active material, a film battery according to Comparative Example 2 was manufactured in the same manner as the film battery of Comparative Example 1.

The axis of abscissas and the axis of ordinates in FIG. 13 denote discharge capacity and voltage of the samples, respectively. That is, FIG. 13 represents variations in voltages according to discharge capacities of the samples.

Referring to FIG. 13, when the sizes and thicknesses of the samples are identical, Experimental Examples 1 and 2 (E1 and E2) had better discharge capacity characteristics than those of Comparative Example 1 and 2 (C1 and C2). For example, Experimental Example 1 had a discharge capacity value of about 1.5 times larger than that of Comparative Example 1.

FIGS. 14 and 15 show results of measuring impedances of the samples in order to investigate contact characteristics between the electrode and the electrolyte.

Referring to FIGS. 14 and 15, Experimental Examples 1 and 2 (E1 and E2) had resistance values lower than those of Comparative Examples 1 and 2 (C1 and C2). That is, as illustrated in FIG. 14, a resistance value ($Z'_{E1}$) of Experimental Example 1 was lower than a resistance value ($Z'_{C1}$) of Comparative Example 1, and as illustrated in FIG. 15, a resistance value ($Z'_{E2}$) of Experimental Example 2 was lower than a resistance value ($Z'_{C2}$) of Comparative Example 2. From the foregoing experimental results, it was confirmed that the film batteries according to the present invention had better contact characteristics than those of Comparative Examples 1 and 2.

The film battery according to the present invention may be provided as a first battery or a secondary battery, and an amount of generated output voltage may vary. Also, since elements constituting the film battery are composed of flexible materials, the film battery according to the present invention may have flexible characteristics. Therefore, the film battery according to the present invention may be used as a power supply of various flexible devices such as a rollable display, e-paper, a flexible liquid crystal display (LCD), a flexible organic light-emitting display (OLED), and a wearable PC. However, it is obvious that electronic products, in which the film battery according to the present invention may be used, are not limited to those exemplified herein.

According to embodiments of the present invention, a pouch film is used as a substrate for a current collector such that a sealed-type film battery capable of blocking gas and moisture penetrations as well as having excellent flexibility may be manufactured.

Also, a gel polymer material having excellent adhesiveness is used as an electrolyte layer. Therefore, the film battery according to the present invention may have excellent adhesion retention properties. That is, adhesion properties between the electrolyte layer and electrode layers or between the electrolyte layers may be excellently maintained.

The pouch-type flexible film battery according to the present invention may be embodied regardless of output voltages. In particular, the pouch-type flexible film battery according to the present invention may be embodied without separate metal-type cathode and anode terminals because the pouch film is used as a substrate for a current collector. For example, a non-metallic conductive carbon layer constituting the current collector is extended, thereby enabling to be used as the cathode and anode terminals.

In a manufacturing process, the pouch film is surface treated to have hydrophilicity such that conductive layer and electrode layer may be directly coated on the pouch film. Therefore, the film batteries according to the present invention may be continuously manufactured through a reel-to-reel manufacturing process. In particular, since inner layers of the pouch film facing to each other that are positioned around the electrode layer may be heat fused during the reel-to-reel manufacturing process, the manufacturing process of the film batteries according to the present invention may be automated, simplified, and continuous.

Also, a gel polymer electrolyte layer having excellent adhesiveness may be coated on an upper portion of the electrode layer through a screen printing method. Since the electrolyte layer may be formed by the screen printing method and the electrolyte layer disposed between the cathode layer and the anode layer has excellent adhesiveness, a process of bonding cathode and anode structures may be performed through a roll-to-roll process.

According to some embodiment, productivity in the manufacturing process may be significantly improved because the film batteries according to the present invention may be manufactured without a decompression process. According to other embodiments, although the bonding operation of the cathode and anode structures may be performed under a decompression condition, excellent sealing characteristics may be also achieved in the bonding operation through a simple method of heat fusing the pouch film. As a result, a film battery having excellent shelf-life and long-life characteristics as well as ensuring simplicity in the manufacturing process may be achieved.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A pouch-type flexible film battery, comprising:
   (a) a cathode structure including a cathode pouch, a cathode conductive carbon layer, and a cathode layer;
   (b) an anode structure including an anode pouch, an anode conductive carbon layer, and an anode layer; and
   (c) a polymer electrolyte layer that is provided between the cathode and anode structures, that is bonded to the cathode layer and to the anode layer, and that is a gel-type electrolyte having adhesive properties and being comprised of a cellulose-based polymer,
   wherein the cathode pouch and the anode pouch each have an inner layer having a surface-treated surface that is hydrophilic, and
   wherein the inner layers are directly contacted to the polymer electrolyte layer by heat fusion,
   wherein the inner layers are formed of ethylene vinyl acetate (EVA) or ethylene vinyl alcohol (EVOH),
   wherein surface treating of the inner layers to provide the respective surface treated surfaces is performed by at least one method of silicate layer formation through a plasma treatment or a flame treatment, wherein the cathode layer and the anode layer are sealed by bonding respective inner layers and the polymer electrolyte layer, and wherein the inner layers have a surface energy of about 50 mN/m or more.

2. The pouch-type flexible film battery of claim 1, wherein the polymer electrolyte layer comprises a polymer matrix including the cellulose-based polymer and a strength reinforced polymer, and wherein a weight ratio between the cellulose-based polymer and the strength reinforced polymer ranges from about 1:99 to about 99:1.

3. The pouch-type flexible film battery of claim 2, wherein the cellulose-based polymer is at least one of cellulose, methyl cellulose, ethyl cellulose, butyl cellulose, hydroxypropyl cellulose, cellulose nitrate, cellulose acetate, cellulose acetate propionate, cellulose acetate butyrate, and carboxymethyl cellulose.

4. The pouch-type flexible film battery of claim 2, wherein the strength reinforced polymer comprises at least one of a polyvinylidene fluoride-based polymer, a polyvinylchloride derivative, an acrylonitrile-based polymer derivative, an acrylate-based polymer, polyvinyl acetate, polyvinyl alcohol, polyimide, polysulfone, and polyurethane, wherein the polyvinylidene fluoride-based polymer includes at least one of polyvinylidene fluoride, poly(vinylidene fluoride-co-hexa fluoropropylene), poly(vinylidene fluoride-co-trifluoroethylene), and poly(vinylidene fluoride-co-tetrafluoroethylene), wherein the acrylonitrile-based polymer derivative includes at least one of a copolymer of acrylonitrile and methylmethacrylate and polyacrylonitrile, and wherein the acrylate-based polymer includes at least one of polymethylmethacrylate, polyethylacrylate, polyethylmethacrylate, polybutylacrylate, and polybutylmethacrylate.

5. The pouch-type flexible film battery of claim 1, wherein the gel-type electrolyte further comprises a lithium salt, wherein the lithium salt is at least one of lithium perchlorate ($LiClO_4$), lithium triplate ($LiCF_3SO_3$), lithium hexafluorophosphate ($LiPF_6$), lithium tetrafluoroborate ($LiBF_4$), lithium trifluoromethanesulfonyl imide ($LiN(CF_3SO_2)_2$), and a combination thereof.

6. The pouch-type flexible film battery of claim 1, wherein at least one of the cathode conductive carbon layer and the anode conductive carbon layer is coated on the surface-treated surface of the inner layer.

7. The pouch-type flexible film battery of claim 6, wherein at least one of the cathode pouch and the anode pouch further comprises an outer layer and an intermediate layer disposed between the inner layer and the outer layer, wherein the outer layer and the inner layer are polymer film layers, and wherein the intermediate layer is a metal layer or a mixed layer of a metal and a polymer film.

8. The pouch-type flexible film battery of claim 1, wherein the cathode pouch and the anode pouch have respective inner layers directly contacted by heat fusion.

9. The pouch-type flexible film battery of claim 1, wherein the gel-type electrolyte further comprises a lithium salt.

* * * * *